SOPHRONIA V. DODGE.

Improvement in Apparatus for Raising Dough.

No. 125,445.

Patented April 9, 1872.

Witnesses:
A Bennenendorf
Francis McArdle

Inventor:
Mrs S. V. Dodge
PER
Attorneys.

125,445

UNITED STATES PATENT OFFICE.

SOPHRONIA V. DODGE, OF DE SOTO, IOWA.

IMPROVEMENT IN APPARATUS FOR RAISING DOUGH.

Specification forming part of Letters Patent No. 125,445, dated April 9, 1872.

Specification describing certain Improvements in Apparatus for Raising Bread, invented by Mrs. SOPHRONIA V. DODGE, of De Soto, in the county of Dallas and State of Iowa.

This invention relates to a new and useful improvement in apparatus for raising bread; and it consists in an outer shell or casing, with a removable false bottom and lamp-chamber, and, in combination therewith, a containing-vessel and lamp, the whole constructed and arranged as hereinafter more fully described.

Figure 1:
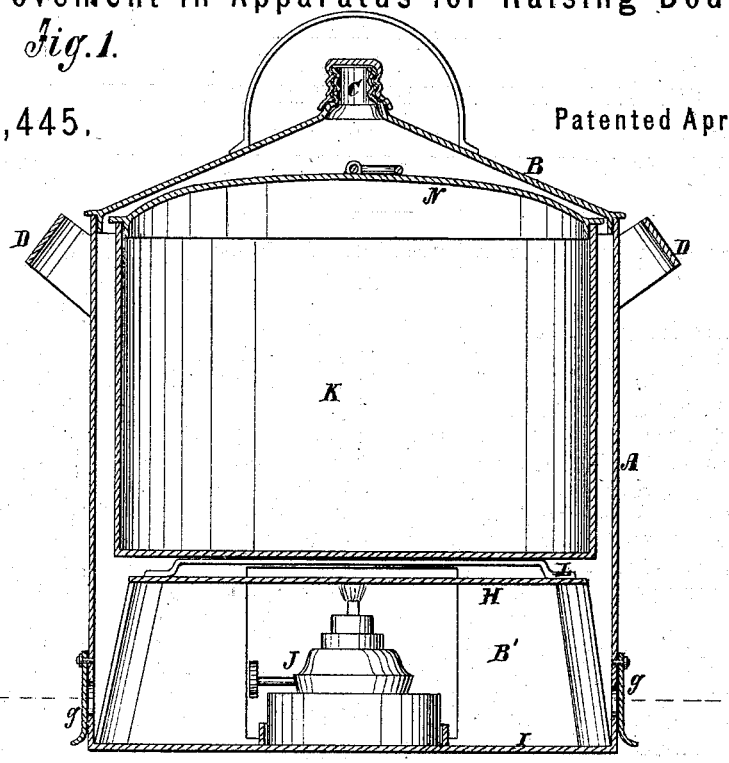
Figure 2:
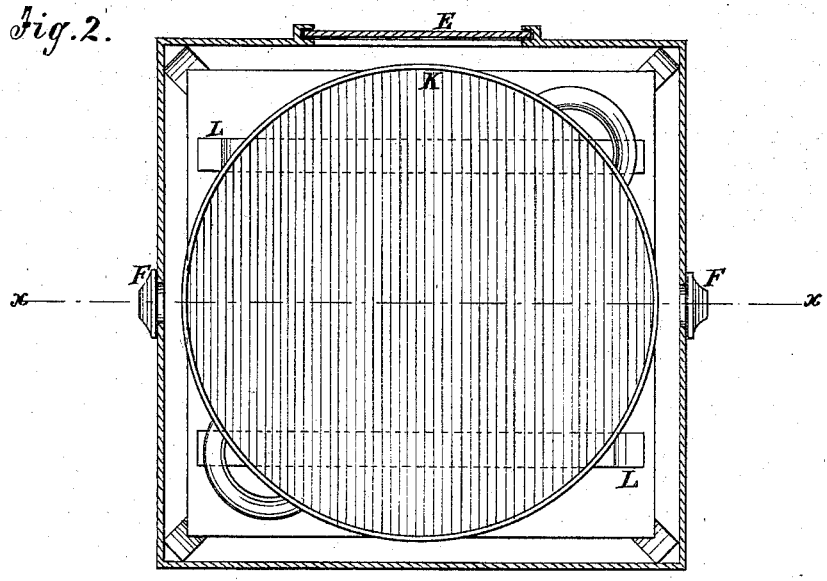

In the accompanying drawing, Figure 1 represents a vertical section of the apparatus taken on the line $x\ x$ of Fig. 2. Fig. 2 is a horizontal section, showing the sliding door and covers of the air-orifices.

Similar letters of reference indicate corresponding parts.

A is the casing, which may be of any size, shape, or dimensions, and of any suitable material. B is the cover, in the center of which is a tube, C, which is closed by a removable screw-cover, as seen in the drawing. D D are the handles. B' is the lamp-chamber. E is a vertically-sliding door, which gives access to the lamp-chamber B'. F F are air-orifices, closed by the button-covers $g\ g$. H is a removable false bottom, supported on legs or otherwise by the bottom I of the casing. J is a small lamp for generating heat. K is the vessel in which is placed the dough or "rising" of which the bread is to be made. This vessel is supported on the raised bars L L of the false bottom, and is entirely surrounded by an air-space within the casing. A very small flame will supply sufficient heat, which will, by this arrangement, be evenly distributed around the containing-vessel K. The contents will be uniformly warmed for producing the desired effect.

This apparatus effects a great saving in time. It does the work thoroughly and perfectly in the coldest weather. The vessel K is provided with a tightly-fitting cover, N, so that a kerosene lamp may be used without any ill effects upon the bread.

Having thus described my invention, I claim as new and desire to secure by Letters Patent—

The combination of casing A, chamber K, lamp-chamber, and false bottom H, provided with bars L, as and for the purpose described.

SOPHRONIA V. DODGE.

Witnesses:
A. P. McCULLOCH, M. D.,
R. D. DODGE.